(12) United States Patent
Reilly et al.

(10) Patent No.: US 12,314,973 B2
(45) Date of Patent: *May 27, 2025

(54) ACCOUNT PROGRAM SYSTEMS AND METHODS

(71) Applicant: Citibank, N.A., New York, NY (US)

(72) Inventors: Sandra Reilly, New York, NY (US); Tim Akpinar, Brooklyn, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,017

(22) Filed: Aug. 31, 2023

(65) Prior Publication Data
US 2023/0410136 A1     Dec. 21, 2023

Related U.S. Application Data

(63) Continuation of application No. 17/229,342, filed on Apr. 13, 2021, now Pat. No. 11,763,329.
(Continued)

(51) Int. Cl.
| | | |
|---|---|---|
| *G06Q 30/02* | (2023.01) | |
| *G06N 20/00* | (2019.01) | |
| *G06Q 30/0208* | (2023.01) | |
| *G06Q 50/20* | (2012.01) | |
| *G06Q 50/26* | (2024.01) | |

(52) U.S. Cl.
CPC ......... *G06Q 30/0208* (2013.01); *G06N 20/00* (2019.01); *G06Q 50/2053* (2013.01); *G06Q 50/26* (2013.01)

(58) Field of Classification Search
CPC .......... G06Q 10/06; G06Q 40/02; G09B 7/02; G06F 16/13
See application file for complete search history.

(56) References Cited

U.S. PATENT DOCUMENTS

| | | | | |
|---|---|---|---|---|
| 10,783,544 | B1 * | 9/2020 | Stringfellow | ........... G06F 16/13 |
| 10,990,881 | B1 * | 4/2021 | Osmak | ..................... G06N 5/02 |

(Continued)

OTHER PUBLICATIONS

International Search Report and Written Opinion for PCT Appl. Ser. No. PCT/US2021/027047 dated Jul. 19, 2021 (13 pages).

*Primary Examiner* — Saba Dagnew
(74) *Attorney, Agent, or Firm* — Foley & Lardner LLP

(57) ABSTRACT

Disclosed are systems and methods that efficiently and reliably allows school district(s) and municipalities as well as third parties provide incentives to students' accounts, and those incentive awards can be converted to funds for additional education expenses. In one aspect, the method includes reconciling a plurality of transactions transferring funds to a student account from a municipal account upon a corresponding student accomplishing at least one of a plurality of goals. The goals are each based upon completion of an action stored in a municipal database. The method includes, upon reconciling the transactions, determining that a remaining amount in the municipal account is less than a predetermined threshold and automatically generating and transmitting an alert message to a dashboard user interface of the municipal account for display on a municipal workstation comprising an indicator that the remaining amount in the municipal account is less than the predetermined threshold.

20 Claims, 6 Drawing Sheets

Related U.S. Application Data

(60) Provisional application No. 63/009,626, filed on Apr. 14, 2020.

(56) References Cited

U.S. PATENT DOCUMENTS

| | | | |
|---|---|---|---|
| 2003/0190593 A1 | 10/2003 | Wisnosky et al. | |
| 2004/0033475 A1* | 2/2004 | Mizuma | G06Q 10/06 434/219 |
| 2004/0143448 A1 | 7/2004 | Easter et al. | |
| 2012/0010930 A1* | 1/2012 | Langdon | G06Q 30/0214 705/14.33 |
| 2013/0060692 A1* | 3/2013 | Typrin | G06Q 40/02 705/44 |
| 2015/0050637 A1* | 2/2015 | James-Hatter | G09B 7/02 434/362 |
| 2015/0193867 A1* | 7/2015 | Del Vecchio | G06Q 40/02 705/39 |
| 2016/0086498 A1 | 3/2016 | Popat et al. | |
| 2017/0076623 A1 | 3/2017 | Grimes et al. | |
| 2018/0351888 A1 | 12/2018 | Howard | |
| 2019/0122307 A1 | 4/2019 | Sayed | |
| 2020/0005157 A1* | 1/2020 | Rosenstein | G06N 5/02 |
| 2020/0104331 A1 | 4/2020 | Azarias et al. | |
| 2020/0357069 A1 | 11/2020 | Berd et al. | |

* cited by examiner

ACCOUNT PROGRAM SYSTEMS AND METHODS

CROSS-REFERENCE TO RELATED PATENT APPLICATIONS

The present application claims priority under 35 U.S.C. § 120 as a continuation of U.S. patent application Ser. No. 17/229,342, titled "Account Program Systems and Methods," filed Apr. 13, 2021, which claims priority to U.S. Provisional Application No. 63/009,626, titled "Account Program Systems and Methods," filed Apr. 14, 2020, each of which are hereby incorporated by reference in their entireties.

TECHNICAL FIELD

The disclosed technology generally relates to student management systems and methods of providing alert messages in the student management systems for tracking financial transactions for school districts and municipalities.

BACKGROUND

School districts may contain thousands or even hundreds of thousands of students. As a result, it can be challenging to efficiently monitor the status of each student, including those that move into the school district and those that leave the school district throughout the year.

Further, many students in public school systems around the country do not have access to post-secondary school education (e.g., colleges, professional schools, trade schools) because, among other things, lack of financial resources and/or access thereto. These students would benefit if they are able to not only have the financial means but be incentivized to perform well in school.

School districts do not maintain the same software platforms, so there are challenges in communicating between various school districts. Also, school districts do not manage financial accounts corresponding to students. There is a desire for a more efficient system that can better manage records of the matriculating students and be capable of managing financial accounts for each of those students.

SUMMARY

One of the many problems facing students today is the ever-increasing costs of higher education. Another problem is a sense of helplessness and/or lack of motivation to succeed. One way to incentivize students to work hard and do well in school is to provide financial incentives. However, not every child is privileged to grow up in a home or even the parents/guardians that can provide this type of motivation. Therefore, a public institution like a school district or a city can provide the funding to enable this type of motivation. However, managing a program that can track each student's progress and financial awards can be very difficult and resource-intensive, particularly for a school district that has not conventionally provided such functionality. One way to accomplish this is to create a student incentive management system ("system") that an administrator from the institution can operate. The system can allow the administrator to create incentives that a student can receive upon accomplishing a goal and associate the goal with a financial incentive that the student can receive upon completion of that goal. The received incentive (e.g., monetary award) can be applied towards any type of post-secondary education that the student wants to commit to.

Creating and reliably managing a system that can monitor and facilitate thousands, if not millions, of students' progress and their financial accounts can be extremely challenging and complex. A school district may have many students that they are trying to serve. For example, for the 2020-2021 school year, the Los Angeles Unified School District has about 665,000 students and the New York City Department of Education has about 1.1 million students. And each student who participates in this program can choose to complete any number of goals with varying amounts of incentives tied to them. Because there is potentially an infinite number of goals and an infinite number of incentives, the volume of data and transactions that need to be securely managed can be overwhelming. Furthermore, there can be a large number of transactions that can occur at any given time. For example, one day (or in one hour or four hours), there can be 50 transactions in which 50 goals were accomplished (by 50 or fewer students) and 50 incentives are paid out from an operator account (e.g., account for the school district or city). On another day, there can be 5000 transactions in which 5000 goals were accomplished (by 5000 or fewer students) and 5000 incentives are paid out to the student accounts from the operator account. There is also the risk of potentially running out of money in the program because so many transactions are happening at any given time.

The present disclosure relates to a system that can help administrators reliably manage and facilitate a student incentive program. The system can include a server that can reconcile all of the unreconciled transactions. When the reconciliation is complete, the server can determine whether the remaining amount is below a predetermined threshold and alert the administrator. The administrator can then decide whether or not to deposit more funds into the account in order to continue incentivizing the students.

In one aspect, a system includes a processor and a non-transitory computer-readable medium comprising instructions that, when executed by the processor, is configured to perform operations including generating a plurality of goals in a municipal database that are available for a plurality of students associated with one of a plurality of schools within a school district. The operation can include, upon receiving data indicating a completion of at least one goal, transferring funds from a municipal account into a plurality of student accounts corresponding to the data indicating the completion of the at least one goal. The operation can include reconciling a plurality of transactions corresponding to the transfer of funds from the municipal account based upon completion of any of the plurality of goals by at least one of the plurality of students in the school district; upon reconciling the transactions, determining that a remaining amount in the municipal account is less than a predetermined threshold. The operation can include automatically generating and transmitting an alert message to a dashboard user interface of the municipal account for display on a municipal workstation comprising an indicator that the remaining amount in the municipal account is less than the predetermined threshold so that the dashboard of the municipal account has immediate access to transaction information and municipal account information.

In another aspect, a system includes a processor and a non-transitory computer-readable medium comprising instructions that, when executed by the processor, is configured to perform operations including reconciling a plurality of transactions transferring funds to a student account from a municipal account upon a corresponding student accomplishing at least one of a plurality of goals, wherein the student is associated with one of a plurality of schools within a school district, and wherein the plurality of goals are each based upon completion of an action stored in a municipal database. The operation can include, upon reconciling the transactions, determining that a remaining amount in the municipal account is less than a predetermined threshold. The operation can include automatically generating and transmitting an alert message to a dashboard user interface of the municipal account for display on a municipal workstation comprising an indicator that the remaining amount in the municipal account is less than the predetermined threshold so that the dashboard of the municipal account has immediate access to transaction information and municipal account information.

In another aspect, a method includes generating a plurality of goals in a municipal database that are available for a plurality of students associated with one of a plurality of schools within a school district. The method can include upon receiving data indicating a completion of at least one goal, transferring funds from a municipal account into a plurality of student accounts corresponding to the data indicating the completion of the at least one goal. The method can include reconciling a plurality of transactions corresponding to the transfer of funds from the municipal account based upon completion of any of the plurality of goals by at least one of the plurality of students in the school district. The method can include upon reconciling the transactions, determining that a remaining amount in the municipal account is less than a predetermined threshold. The method can include automatically generating and transmitting an alert message to a dashboard user interface of the municipal account for display on a municipal workstation comprising an indicator that the remaining amount in the municipal account is less than the predetermined threshold so that the dashboard of the municipal account has immediate access to transaction information and municipal account information.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
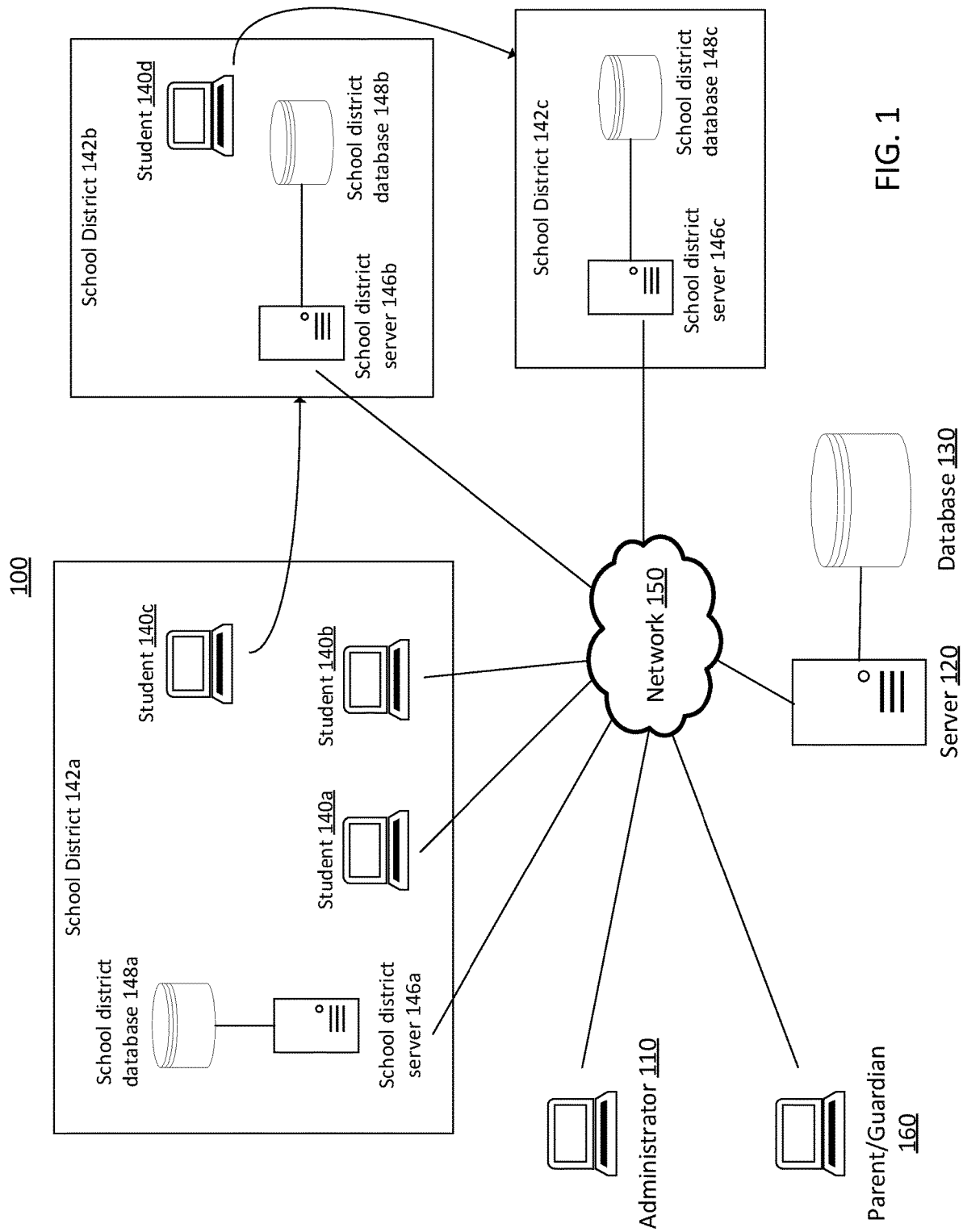
FIG. 1 illustrates components of a student incentive management system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

A student incentive management system and a method of providing alert messages for the same are disclosed. In one aspect, the method includes reconciling a plurality of transactions transferring funds to a student account from a municipal account upon a corresponding student accomplishing at least one of a plurality of goals to obtain an incentive (e.g., monetary award). The plurality of goals are each based upon completion of an action stored in a municipal database, and an incentive is paid to a student account from a municipal account upon completion of the action. The method includes, upon reconciling the transactions, determining that a remaining amount in the municipal account is less than a predetermined threshold and automatically generating and transmitting an alert message to a dashboard user interface of the municipal account for display on a municipal workstation comprising an indicator that the remaining amount in the municipal account is less than the predetermined threshold so that the dashboard of the municipal account has immediate access to transaction information and municipal account information.

FIG. 1 illustrates components of a student incentive management system 100. The system 100 may include a server (or system server) 120, system (or municipal) database 130, end-user devices (or student devices) 140a, 140b, 140c, and 140d (collectively student devices 140), school districts 142a, 142b, and 142c (collectively school districts 142), school district servers 146a, 146b, and 146c (collectively school district servers 146), school district databases 148a, 148b, and 148c (collectively school district databases 148) and an administrator device (or workstation) 110, and a parent (or guardian) device 160. The above-mentioned components may be connected to each other through a network 150. Examples of the network 150 may include, but are not limited to, private or public LAN, WLAN, MAN, WAN, and the Internet. The network 150 may include wired and/or wireless communications according to one or more standards and/or via one or more transport mediums. The system 100 is not confined to the components described herein and may include additional or other components, not shown for brevity, which are to be considered within the scope of the embodiments described herein.

In the present disclosure, the administrator device 110 can display an administrator account, the parent/guardian device 160 can display a parent/guardian account, and the student device 140 can display a student account. However, embodiments are not limited thereto, and the administrator account, parent/guard account, and student account can be displayed on any device with a display and a connection to network and the proper credentials. In the present disclosure, the administrator device 110 can be interchangeable with administrator account, the parent/guardian device 160 can be interchangeable with parent/guardian account, and the student device 140 can be interchangeable with student account. Furthermore, although only one administrator device 110 is shown in FIG. 1, embodiments are not limited thereto. The administrator device 110 can be a device operated by the school district(s) or by a municipality (e.g., a city) or both. Depending on a program and/or the system 100 implemented by the school district(s) and/or city, the administrator device 110 can be in each of the school district(s) and/or city. For example, the administrator in the city can be a program manager who can generally manage the program and approve and/or deny incentive awards based on a review of the students' activity. In this disclosure, the administrator device 110 can include the administrator in the school district(s) and/or the city.

The communication over the network 150 may be performed in accordance with various communication protocols such as Transmission Control Protocol and Internet Protocol (TCP/IP), User Datagram Protocol (UDP), and IEEE communication protocols. In one example, the network 150 may include wireless communications according to Bluetooth specification sets or another standard or proprietary wireless communication protocol. In another example, the network 150 may also include communications over a cellular network, including, e.g., a GSM (Global System for Mobile Communications), CDMA (Code Division Multiple Access), EDGE (Enhanced Data for Global Evolution) network.

The server 120 may generate and display an electronic platform configured to use various computer models (including artificial intelligence and/or machine learning models) to display the status of a student incentive program ("program"). The electronic platform may include graphical user interfaces (GUI) displayed on the student devices 140, the parent/guardian device 160 and/or the administrator device 110. An example of the electronic platform generated and hosted by the analytics server 120 may be a web-based application or a website configured to be displayed on different electronic devices, such as mobile devices, tablets, personal computer, and the like. In a non-limiting example, a school district administrator operating the administrator device 110 may access the platform, input incentive program data or characteristics and other data, and further instruct the server 120 to transfer funds into or out of a municipal (or operator) account.

The operator account can include the funds that the city and/or school district allocated for the incentive program. In addition, the program can include third party accounts that can also provide incentive amounts to the student account. For example, a parent can have a parent account that has funds that are allocated by the parent(s) who provide incentive awards to the student for meeting certain incentives. Another example, a non-profit organization can create an account that has funds allocated by the organization and used to incentivize students to do well in school. The term "operator account" contemplates all accounts set up by the school district, city, and third party accounts.

The server 120 may utilize the methods and systems described herein to process and/or administer the student incentive program and display the results and/or status on the student devices 140 or adjust the configuration of one of student devices 140. The server 120 may display the status on the administrator device 110 itself as well.

The server 120 may host a website accessible to users operating any of the electronic devices described herein (e.g., end users), where the content presented via the various webpages may be controlled based upon each particular user's role or viewing permissions. The server 120 may be any computing device comprising a processor and non-transitory machine-readable storage capable of executing the various tasks and processes described herein. Non-limiting limiting examples of such computing devices may include workstation computers, laptop computers, server computers, and the like. While the system 100 includes a single server 120, the server 120 may include any number of computing devices operating in a distributed computing environment, such as a cloud environment.

The server 120 may execute software applications configured to display the electronic platform (e.g., host a website), which may generate and serve various webpages to the administrator device 110, parent/guardian device 160 and/or student devices 140. Different users may use the website to view and/or interact with the student incentive program.

The server 120 may be configured to require user authentication based upon a set of user authorization credentials (e.g., username, password, biometrics, cryptographic certificate, and the like). The server 120 may access the system database 130 configured to store user credentials, which the server 120 may be configured to reference in order to determine whether a set of entered credentials (purportedly authenticating the user) match an appropriate set of credentials that identify and authenticate the user.

The server 120 may also store data associated with each user operating one or more administrator devices 110, parent/guardian device 160 and/or student devices 140. The server 120 may use the data to weigh interactions while training various AI models accordingly. For instance, the server 120 may indicate that a user is a student whose inputs may be monitored and used to train the machine learning or other computer models described herein.

The server 120 may generate and host webpages based upon a particular user's role within the system 100. In such implementations, the user's role may be defined by data fields and input fields in user records stored in the system database 130. The server 120 may authenticate the user and may identify the user's role by executing an access directory protocol (e.g. lightweight directory access protocol). The server 120 may generate webpage content that is customized according to the user's role defined by the user record in the database 130.

The server 120 may receive program data (e.g., incentive selection data, incentive completion data, funding data) from a user or retrieve such data from a data repository, analyze the data, and display the results on the electronic platform. For instance, in a non-limiting example, the server 120 may query and retrieve completed incentives from the database 130 and combine the incentive selections from a student operating the student device 140a. The server 120 may then use various models (stored within the system database 130) to analyze the retrieved data. The server 120 then displays the results (e.g., likelihood of student's completion of incentive) via the electronic platform on the administrator device 110, parent/guardian device 160 and/or the student device 140a. The database 130 may store data concerning students, their demographics (e.g., city of residence, schools attended, and grade in school), incentive selections, incentive completion rates, received amounts, transcript, and others. The collected data can be used to train the machine learning model to predict, for example, the likelihood of a student's completion of an incentive goal, the amount of money the student is expected to earn with the incentives, or a list of goals that a particular student should seek to accomplish/complete in the next school year, etc.

Student devices 140 may be any computing device comprising a processor and a non-transitory machine-readable storage medium capable of performing the various tasks and processes described herein. Non-limiting examples of a student device 140 may be a workstation computer, laptop computer, tablet computer, and server computer. In operation, various users may use student devices 140 to access the GUI operationally managed by the server 120. Specifically, the student devices 140 may include a parent's computer, a guardian's computer, a sibling or relative's computer, a computer at an after-school program, etc.

The administrator device 110 may represent a computing device operated by a system administrator. The administrator device 110 may be configured to display data retrieved, the status and/or status updates regarding the student incentive program retrieved from the server 120 where the system administrator can monitor various models utilized by the server 120 and/or student devices 140 and/or facilitate training or calibration of the neural networks that are maintained by the server 120.

In operation, a student may access an application executing on the student device 140a and select an incentive (or goal) for completion. The server 120 can receive the selection and register the incentive/goal on a corresponding student account. When the student accomplishes the goal, the student can input into the student device 140a that the goal has been accomplished. The administrator device 110 can display an alert message, generated and transmitted by the server 120, indicating that the student accomplished the goal. The server 120 can keep a record of the student's accomplishments in the database 130 and make various predictions regarding the student's future ability to accomplish goals based on a trained neural network. The server 120 may be in communication (real-time or near real-time) with the administrator device 110, such that a server/computer hosting the administrator device 110 can adjust the administrator device 110 based on the status of the program that is updated by the server 120.

School districts 142a, 142b, and 142c may include public school districts. The school district 142a can include the school district server 146a, school district database 148a, student devices 140a, 140b and 140c. School district 142b can include student device 140d, the school district server 146b, and school district database 148b. School district 142c can include the school district 146c and the school district database 148c. The school district databases 148 can store data regarding the students in the corresponding school districts such as attendance records and grades. The school district servers 146 can be connected to the school district databases 148 and transmit the data to the server 120 on a regular basis or on demand. For example, at the end of each quarter or semester of a school year, the school district servers 146 can transmit the attendance record and/or grades to the server 120 via the network 150. The server 120 can receive the data and automatically determine whether the students in the respective school districts were able to accomplish their goals that relate to the attendance and/or grades. For example, if the student for student device 140a had the goal of having a perfect attendance record, the school district server 146a can retrieve the corresponding attendance record data from the school district database 148a and transmit the data to the server 120. The server 120 can automatically determine whether the student was able to accomplish the goal of having a perfect attendance record for the semester based on the goal that was retrieved from the database 130. The server can transfer the corresponding incentive amount from the operator account to the student account for the student.

Figure 2:
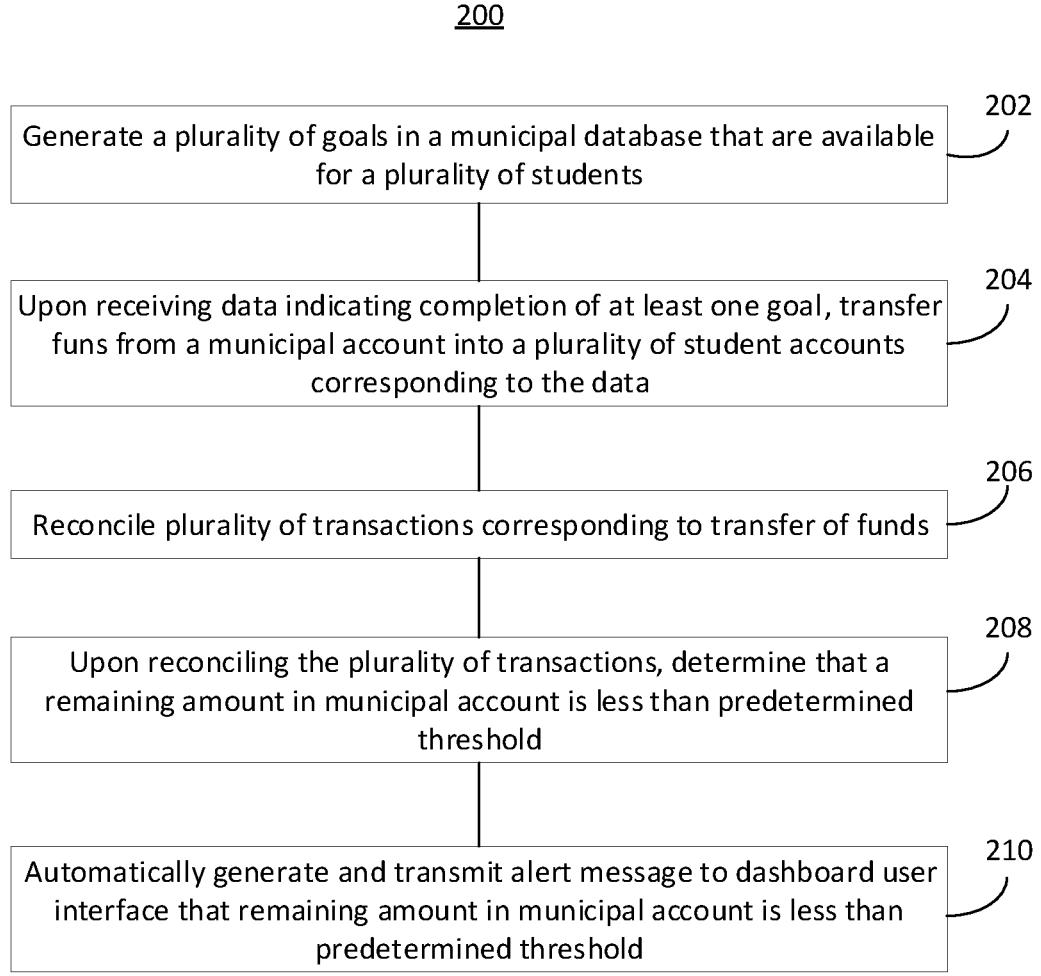
FIG. 2 illustrates an example flow diagram of a process executed in a student incentive management system, according to an embodiment.

FIG. 2 illustrates a flow diagram of a process executed in a student incentive management system, according to an embodiment. The method 200 includes operations 202-210. However, other embodiments may include additional or alternative steps, or may omit one or more steps altogether. The method 200 is described as being executed by a data processing system (e.g., a computer similar to the server 120 described in FIG. 1). However, one or more steps of method 200 may be executed by any number of computing devices operating in the distributed computing system described in FIG. 1. For instance, one or more computing devices may locally perform part or all of the steps described in FIG. 2 or a cloud device may perform such steps.

At operation 202, the server 120 may generate a plurality of goals that are available for the students. The goals can be geared or directed to helping a student have better behavior or be a better student. An example of a goal may include having a perfect attendance in school or obtaining straight A's for a semester. The goals may be stored in the database (or municipal database or a school district database) 130. The database 130 may be operated by a municipality, a school district, a state, national/federal entity like the Department of Education (hereinafter referred to as "operator"). For simplicity, the disclosure will describe the example of when the operator is a school district, but embodiments are not limited thereto.

There can be a plurality of incentive types. Although three different types of incentives have been discussed herein, the embodiments are not limited thereto, and fewer or additional types of incentives can be implemented.

The first type can be based on a predetermined goal within the system 100 and available for completion by any student within the school district. For example, an administrator can award an incentive to any student who registers their account with the system 100. The system 100 can include a predefined incentive amount that is tied to meeting this predetermined goal such as $10 for registering their contact info with the system. Accordingly, every student can be awarded the incentive award for any of these goals.

A second type of incentive can be based on a goal that the student can define and is not predetermined within the system 100. For example, a student may want to set a goal or incentive for himself or herself by creating a goal that says "join junior varsity tennis team." When the student inputs this goal, the administrator can review and approve the incentive as well as associate an appropriate dollar amount for accomplishing the goal. Accordingly, if the student makes the junior varsity tennis team, the student can indicate that the student made the team, and the administrator can approve the incentive award.

A third type of incentive can be based on a behavior goal. For example, a student can receive an incentive award for having a perfect attendance over a period of time such as a month, a quarter or a semester. Once the server 120 receives data that the student accomplished the goal of perfect attendance, the server 120 can transfer funds from the operator account to the student account.

The server 120 can receive a first input from a student indicating that the student has selected one or more goals. Each student may select one or more goals that they want to achieve within a certain time period. For example, a first student may select that the first student wants to receive all A's or B's only miss up to three days of school during the semester. As another example, a second student may select that the second student wants to submit every homework assignment on time and receive an award for a science competition. The goal's timeline can be as long or as short as the operator allows. For example, a goal for one week can be to submit every homework assignment and not be tardy for class. Each goal may have an incentive (or incentive amount) that is associated with the goal that the operator is committing to award the student for accomplishing that goal. For example, for a goal of all A's or B's for the semester, the operator may commit $10 for every student that accomplishes this goal. As another example, for the goal of attaining a perfect attendance for the entire school year, the operator may commit $25 for every student that accomplishes this goal. Accordingly, there can be a large variety and combination of goals and incentives that students may choose from. The database 130 can keep a record of each student, starting with kindergarten until the end of $12^{th}$ grade, or whenever the student leaves the school district. The database 130 can also keep track of all of the goals that each student selected and whether or not that goal was accomplished. Once the student graduates from $12^{th}$ grade, the student can withdraw the accumulated funds from the student account and apply it towards post-secondary education costs.

At operation 204, upon the server 120 receiving data that indicates completion of at least one goal, the server 120 (or a program manager) can transfer funds from the operator account to the student accounts that corresponds to the incentive amount associated with the accomplished goal. The server 120 can receive the data in several ways. For example, the student can input in the student device that the student accomplished the goal. Also, the school district server can automatically retrieve the data and transmit it to the server 120. Also, the administrator and/or parent/guardian can input data into their respective administrator device 110 or the parent/guardian device 160 that the student accomplished their goal.

The server 120 can transfer funds from the operator account to the student accounts corresponding to the student who accomplished the goal the incentive amount that was associated with the accomplished goal. For example, if the operator had committed $25 for achieving the goal of getting straight A's, and the student accomplished that goal, the server 120 can automatically transfer $25 from the operator account to the student account. Alternatively, the server 120 can transfer the funds from a parent/guardian account to the student account if the parent/guardian had set up a goal in such a manner. For example, when a default incentive amount in the database 130 for a goal of perfect attendance may be $25, the parent/guardian may choose to add an additional $25 to motivate/incentivize the student more. In such a case, the student account would be transferred $25 from the parent/guardian account in addition to the $25 from the operator account. Each transfer of money from the operator account and/or the parent/guardian account to the student account can be referred to as a transaction.

For a large school district or municipality, the number of transfers between the operator account to the student accounts can vary day to day. On one day, the number of transfers may be low with the total amount transferred out of the operator account being low. On another day, the number of transfers may be high with the total amount transferred out of the operator account being high.

At operation 206, the server 120 can reconcile all of the transactions. Reconciling can include ensuring that all of the incentives that were supposed to be transferred to the student accounts were properly transferred and the amounts debited from the operator accounts equal the amounts credited to the student accounts. The reconciling can occur on a regular basis to ensure that the operator account has a sufficient amount of funds to pay out all of the remaining incentives. For example, the reconciliation can occur every day, every hour, etc. The reconciliation can also occur every predetermined number of transactions. For example, the server 120 can reconcile the transactions every 1000 transactions, 5000 transactions, etc. The reconciliation can also occur every time a transaction involves more than a certain amount of money. For example, if a student accomplishes a goal that has an associated incentive amount of $100 or more, the server 120 can reconcile the transactions. When the reconciliation is complete, the administrator can view a remaining amount that is left in the operator account.

The reconciling can also include reconciling student transfers. For example, students can change school districts in the middle of a school year. For example, referring to FIG. 1, the parents of the student for student device 140c can move from the city where school district 142a is located to a different city where the school district 142b is located. Then the system 100 has to track the student's attendance record in both school districts 142a and 142b. For example, while the student is attending a school in school district 142a, the school district server 146a and the school district 148a can keep an attendance record of the student for that time period. Then when the student moves from the school district 142a to the school district 142b, the school district server 146b and the school district database 148b can maintain the student's attendance record starting when the student is part of the school district 142b. At the end of the quarter or semester, the server 120 can retrieve the attendance record for the student from both school district 142a and school district 142b and reconcile any gaps in attendance. For example, if the student missed the second half of the quarter in school district 142a, the attendance record from school district 142a will show that the student was absent for the second half of the quarter. And if the student was not yet in the school district 142b, the attendance record from school district 142b will show that the student was absent the first half of school district 142b. The server 120 can reconcile the gaps in the student's attendance record and determine that the student still had a perfect attendance record and determine that the student satisfied the perfect attendance goal.

Furthermore, depending on the administrator and school district, the student may not be able to transfer with the incentive. For example, the school district 142a or municipality that includes the school district 142a may have a rule where a student must be in the school district 142a or a school district within the municipality by the time of graduation of high school in order to receive the full incentive amounts. The rule may indicate that when the student leaves the school district 142a, the student can only take none or only a portion of the incentive awards with them to the new school district. The server 120 can reconcile automatic withdrawals from the student accounts upon a student transfer.

At operation 208, upon the completion of a reconciliation, the server 120 can determine whether the remaining amount in the operator account is less than a predetermined threshold (or alert threshold). For example, if the remaining amount is $100,000, and the predetermined threshold is $200,000, the server 120 can determine that the remaining amount is less than the predetermined threshold. As another example, the predetermined threshold can be a percentage of the initial amount. For example, if the initial amount that the operator account included was $10 million, the predetermined threshold can be a percentage (e.g., 10%) of the initial value (10% of $10 million=$1 million). In this case, when the remaining amount is less than $1 million, the server 120 can determine that the remaining amount is less than the predetermined threshold.

An administrator can modify the predetermined threshold to be greater or less than the default value and/or the previously modified value. For example, if the default predetermined threshold value is $100,000, the administrator can input into the administrator device 110 to change the predetermined threshold to be greater such as $200,000 or less such as $50,000. When the predetermined threshold is a percentage (e.g., 10%), the administrator can increase or decrease the percentage (e.g., 20% or 5%).

In some embodiments, the administrator can set a plurality of predetermined thresholds that are greater than the first predetermined threshold. For example, if the original predetermined threshold is $100,000, the administrator can set two more predetermined thresholds at $200,000 and $350,000. Setting multiple predetermined thresholds can help alert the administrator that the remaining amount is approaching a minimum amount. Then the administrator can decide whether or not to deposit more funds into the operator account.

At operation 210, upon determining that the remaining amount is less than the predetermined threshold, the server 120 can automatically generate and transmit an alert message to a display of the administrator device 110 that the remaining amount is less than the predetermined threshold. The alert message can appear on a dashboard user interface of the display so that the administrator can immediately access transaction information and operator account information such as the remaining amount, the transactions that were made since the last reconciliation, how many and which students transferred out of the school district or transferred into the school district, the number of goals that were achieved, the incentive amounts awarded for each of the goals, etc. For example, upon receiving the alert message through the dashboard, the administrator can have access to all of the data that the server 120 has access to in the database 130. Although described as an alert message on a dashboard (e.g., a web page user interface on a browser), the alert message can also notify the user as a pop-up message, push notification, text message, graphical indicator, or other electronic notification.

In some embodiments, when the administrator sets multiple predetermined thresholds, the administrator can receive an alert message for every instance that the remaining amount is less than each of the predetermined thresholds. For example, if the predetermined thresholds are set at $100,000, $200,000 and $350,000. The server 120 can automatically generate and transmit to the administrator device 110 a first alert message when the remaining amount is less than $350,000, a second alert message when the remaining amount is less than $200,000, and a third alert message when the remaining amount is less than $100,000.

In some embodiments, the administrator can set a stop threshold in the operator account. When the server 120 determines that the remaining amount is less than the stop threshold, the server 120 can automatically stop or prevent any additional funds from being transferred from the operator account to the student accounts. For example, when the stop threshold is 2% and the initial amount is $10 million, a stop threshold amount is $200,000. In this example, if the remaining amount drops below 2%, the server 120 can stop or prevent any further transfers between the operator account and the student accounts. When the server 120 determines that the remaining amount is less than the stop threshold, the server 120 can automatically generate and transmit an alert message to the administrator device 110 that the server 120 has stopped transferring funds from the operator account into the student accounts. Then the administrator can choose to deposit more funds into the operator account in order to bring the remaining amount above the stop threshold and/or alert threshold amounts.

In some embodiments, the server 120 can automatically determine the appropriate stop threshold and/or predetermined threshold by using machine learning. For example, the server 120 can retrieve from the database 130 various historical data such as students' goal completion rates (e.g., the rate at which the students completed their goals per student and/or per year), incentive amounts awarded (e.g., the incentive amounts that were awarded to each student per goal), numbers of students in the school district, etc. The server 120 can then train a machine learning model to predict how much money that the operating account can expect to transfer to student accounts on any given day. Then based on that prediction, the server 120 can determine the stop threshold to be high enough that the remaining amount does not go below $0 after any reconciliation and low enough that the operator account can continue awarding incentives to students who accomplish their goals. And the server 120 can determine an alert threshold based on the stop threshold. For example, the server 120 can set the alert threshold to be a certain multiple more than the stop threshold (e.g., alert threshold=stop threshold×2) or a certain dollar mount (e.g., alert threshold=stop threshold+$100,000). Accordingly, the administrator can monitor and administer the program without unnecessary interruptions that may happen if the stop threshold is too high (i.e., unnecessarily stopping incentives from being transferred to the student accounts).

In some embodiments, when the remaining amount is below the stop threshold, the server 120 can deposit a predetermined amount into the operating account. For example, if the server 120 determines that the remaining amount of $150,000 is below the stop threshold of $200,000, the server 120 can automatically deposit $100,000 to the operator account so that the remaining amount increases to $250,000. Then the program can continue operating normally and the students can continue to receive incentives for their accomplished goals without interruption.

Figure 3:
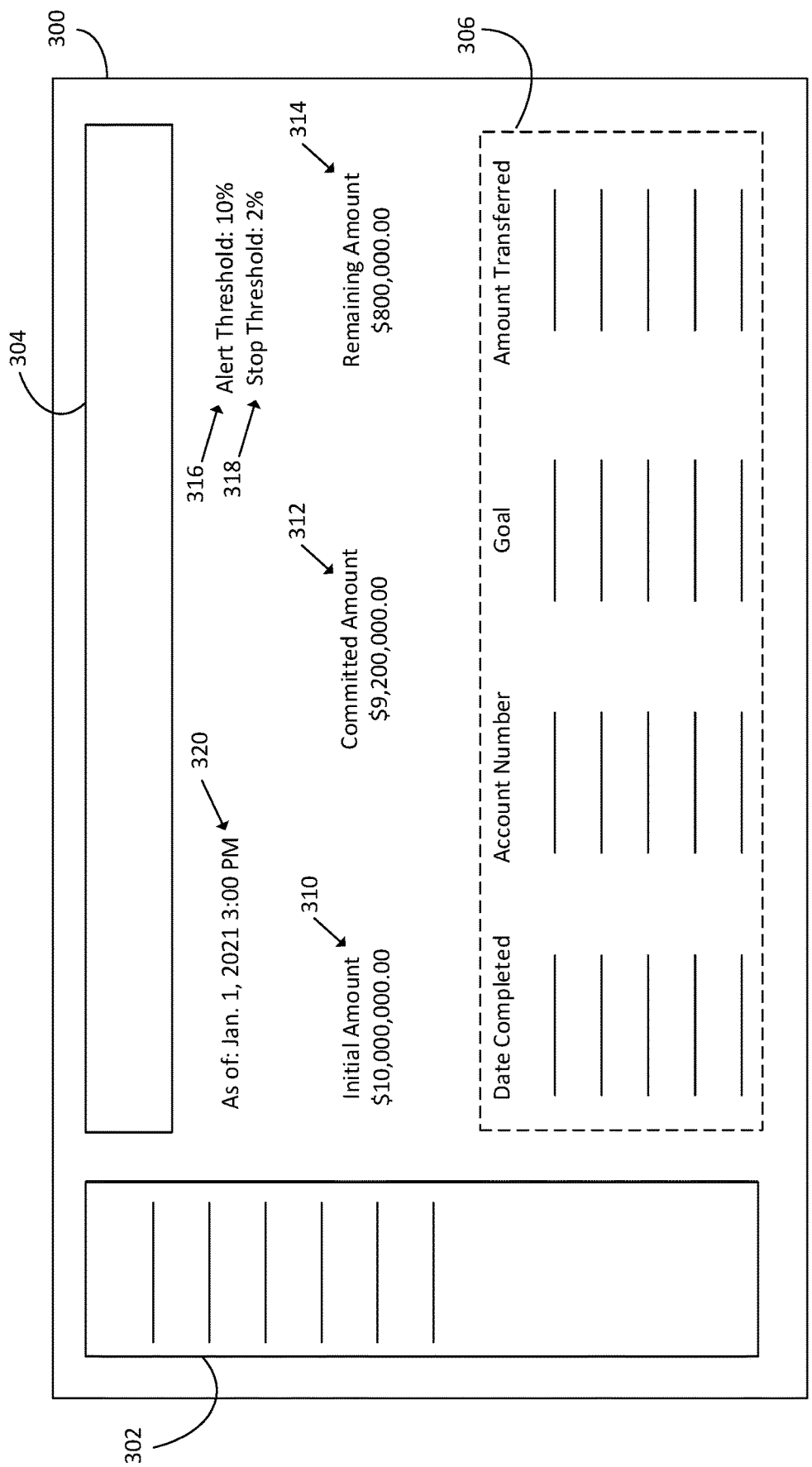
FIG. 3 illustrates a dashboard of an administrator device of the student incentive management systems of FIG. 1, according to an embodiment.

FIG. 3 illustrates a dashboard 300 of an administrator workstation of the student incentive management systems of FIG. 1, according to an embodiment. The dashboard 300 can be displayed using a graphical user interface (GUI) on the display of the administrator device 110 (e.g., as a web page on a browser). The dashboard 300 can display a navigation bar 302, an alert bar 304, and a transaction history section 306. The dashboard can also display the initial amount 310, committed amount 312, remaining amount 314, alert threshold 316, stop threshold 318, and the last reconciled time 320. Although certain words and numbers are shown in FIG. 3, this is for illustrative purposes only, and embodiments are not limited thereto. Further, the sizes and shapes of the have been drawn illustrative purposes only, and embodiments are not limited thereto.

The navigation bar 302 can include different icons and/or text that the user can select to navigate to a different view of the dashboard. For example, FIG. 3 shows a view of the dashboard that includes the transaction history 306 and the initial amount 310, committed amount 312, remaining amount 314, alert threshold 316, stop threshold 318, and the last reconciled time 320. As another example, when the administrator selects another item in the navigation bar 302, the view of the dashboard 300 can change to a list of students who are participating in the program. Another view of the dash 300 can include a list of authorized users and their levels of access/permissions to a particular student account.

The alert bar 304 can display any alert messages that the server 120 generates and transmits to the administrator device 110. The alert message can be displayed with a variety of symbols, words and/or numbers, and color schemes to draw the viewer's (e.g., administrator's) attention towards it. Further details on the alert bar 304 is described with regard to FIGS. 4A and 4B.

The transaction history section 306 can display the various transactions that have been completed between the operator account and the student accounts. For example, when funds are transferred from the operator account to a student account, the transaction can be recorded in the transaction history section 306.

The initial amount 310 can include an amount that the administrator deposited into the operator account. The committed amount 312 can include an amount that the operator has already transferred to the student accounts. The remaining amount 314 can include the amount that remains after the transactions have all been completed to date. When the reconciliation is completed, the server 120 can adjust the committed amount 312 and the remaining amount 314 to reflect the reconciled amounts. The alert threshold 316 can include the predetermined threshold that the administrator has set (or by default) to be the threshold that the remaining amount has to be less than the initial amount in order to be alerted. The stop threshold 318 can include the threshold that when the remaining amount is below the stop threshold, the operator account stops transferring money to the student accounts. The last reconciled time 320 can include the date and/or time that the server 120 last reconciled all of the transactions in the system/program.

Figure 4A:
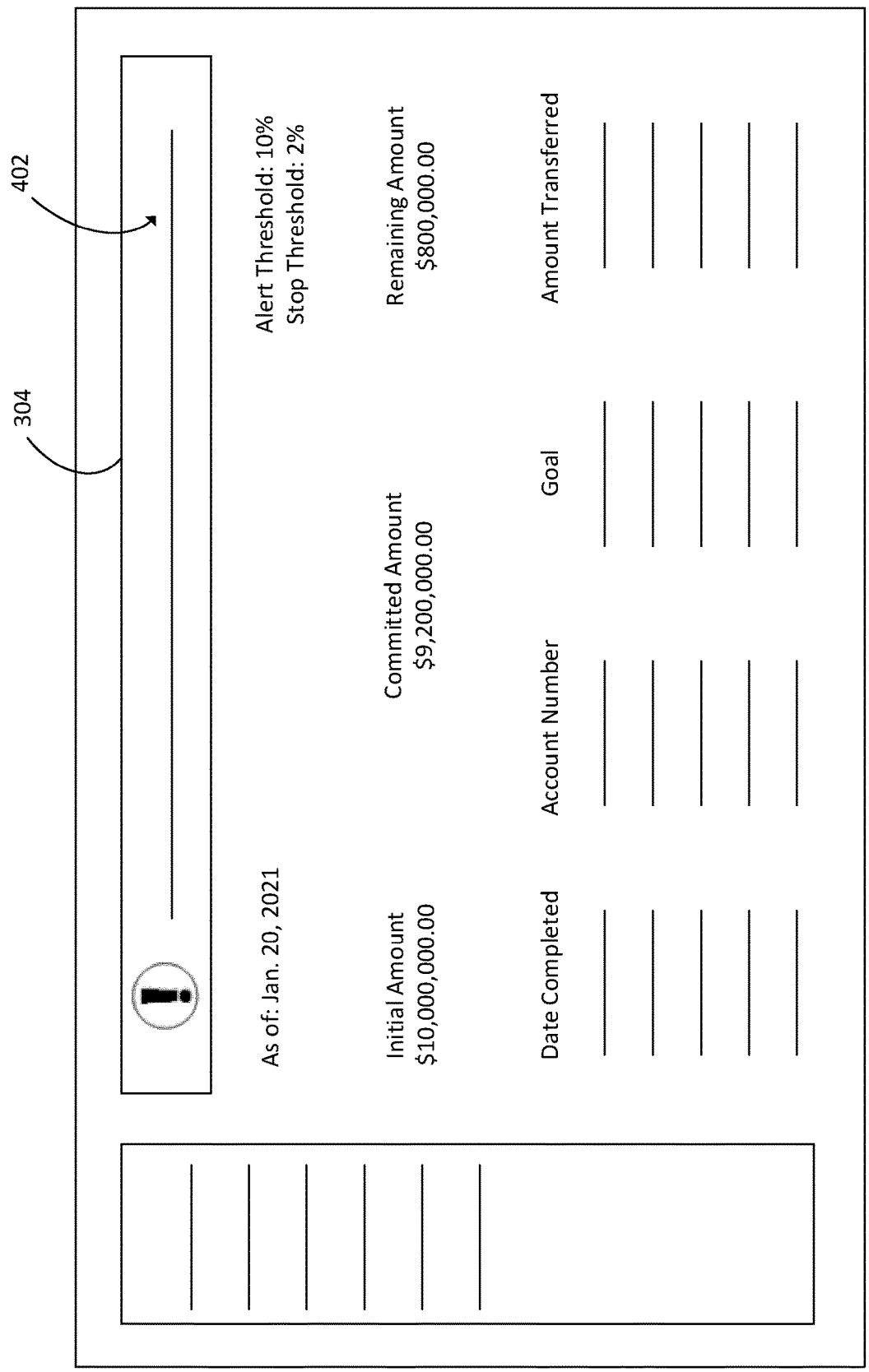
FIG. 4A illustrates the dashboard of FIG. 3 including an alert message, according to an embodiment.

FIG. 4A illustrates the dashboard 300 including an alert message 402, according to an embodiment. For example, when a student opts out of the program, the administrator device 110 can receive and display the alert message 402 in the alert bar 304 that indicates that the student has opted out of the program. As another example, when the server 120 determines that the remaining amount in the operator account is less than a predetermined threshold, the alert bar 304 can display an alert message 402 indicating that the remaining amount is less than the predetermined threshold. In some embodiments, the alert message 402 can indicate that the remaining amount in the operator account is less than the predetermined threshold which is a dollar amount. In some embodiments, the alert message 402 can include the predetermined amount including a percentage.

Figure 4B:
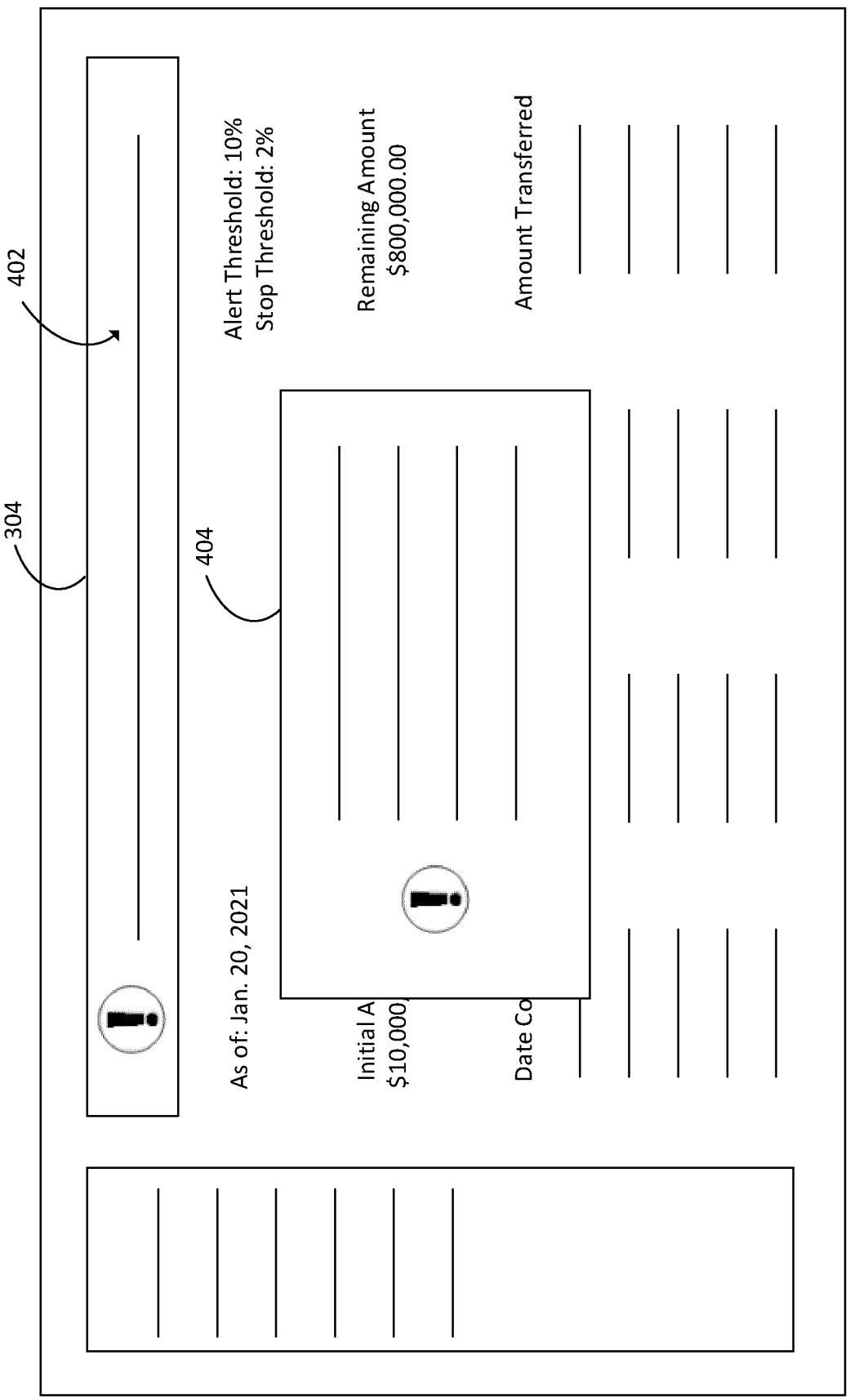
FIG. 4B illustrates the dashboard of FIG. 3 including another alert message, according to an embodiment.

FIG. 4B illustrates the dashboard 300 including a pop-up alert 404, according to an embodiment. When the server 120 determines that the remaining amount is less than the predetermined threshold, the server 120 can automatically generate and transmit an alert message to the administrator device 110. The administrator device 110 can then display a pop-up alert 404 that includes the alert message. The pop-up alert 404 can be displayed in addition to the alert message in the alert bar 304 to ensure that the administrator is alerted to the remaining amount in the operator account.

Figure 5:
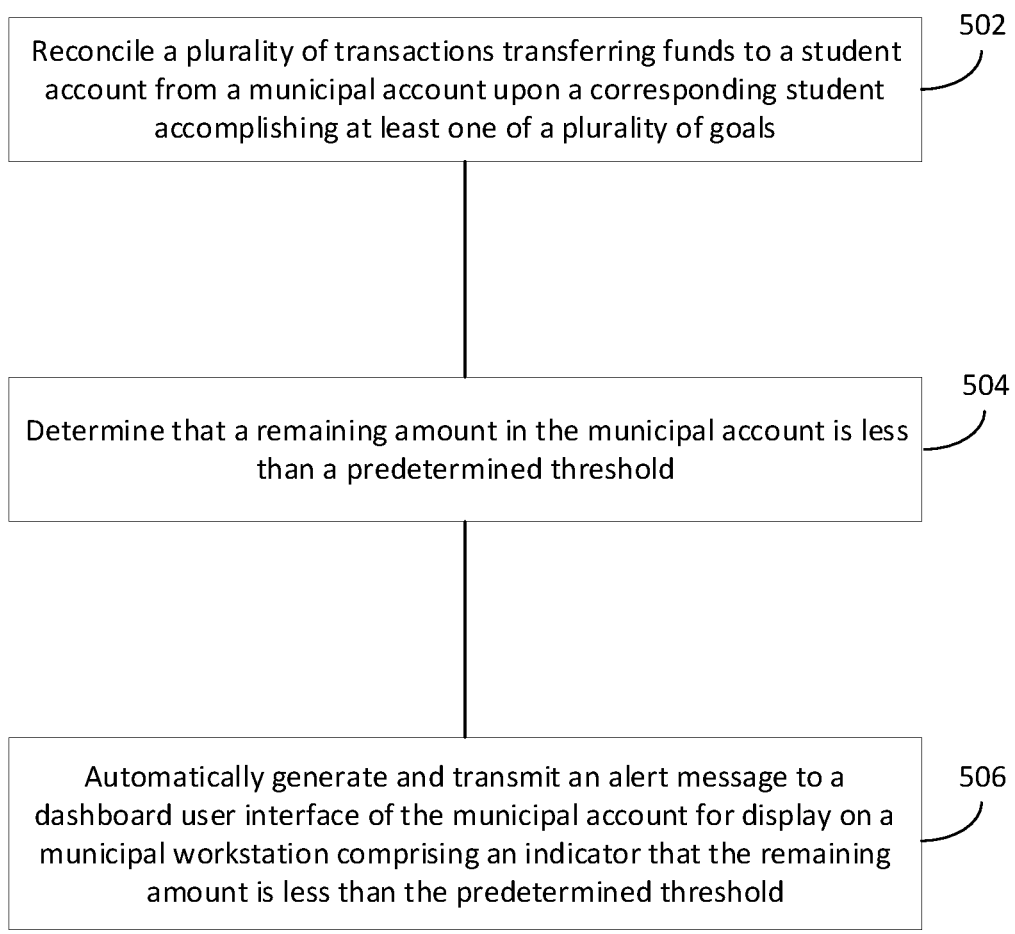
FIG. 5 illustrates an example flow diagram of a process executed in a student incentive management system, according to an embodiment.

FIG. 5 illustrates a flow diagram of a process executed in a student incentive management system, according to an embodiment. The method 500 includes operations 502-506. However, other embodiments may include additional or alternative steps, or may omit one or more steps altogether. The method 500 is described as being executed by a data processing system (e.g., a computer similar to the server 120 described in FIG. 1). However, one or more steps of method 500 may be executed by any number of computing devices operating in the distributed computing system described in FIG. 1. For instance, one or more computing devices may locally perform part or all of the steps described in FIG. 5 or a cloud device may perform such steps.

At operation 502, the server 120 may reconcile a plurality of transactions transferring funds to a student account from a municipal account upon a corresponding student accomplishing at least one of a plurality of goals. At operation 504, the server 120 may determine that a remaining amount in the municipal account is less than a predetermined threshold. At operation 506, the server 120 may automatically generate and transmit an alert message to a dashboard user interface of the municipal account for display on a municipal workstation comprising an indicator that the remaining amount is less than the predetermined threshold.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by a server, from a plurality of computing devices, data indicating completion of at least one goal of a plurality of goals by a plurality of users across a plurality of networks, each of the plurality of goals defining a corresponding action to be completed;
   reconciling, by the server, a plurality of transaction by verifying transfers from a first account to a plurality of second accounts associated with the plurality of users based on the data indicating the completion of the at least one goal;
   applying, by the server, a machine learning model to the data, wherein the machine learning model is trained using historical data indicating a rate of completion of one or more of the plurality of goals and previous transfers from the account;
   determining, by the server, based on applying the machine learning to the data, a threshold against which to compare a remaining amount in a first account associated with an administrator device;
   determining, by the server responsive to reconciling, that the remaining amount in the first account is less than the threshold determined using the machine learning model;
   automatically generating, by the server, an alert message comprising an indicator that the remaining amount in the first account is less than the threshold; and
   transmitting, by the server, the alert message to present via a graphical user interface of the account to provide the administrator device immediate access to information regarding the first account.

2. The method of claim 1, further comprising applying, by the server, a second machine learning model to the data determine a predicted likelihood of at least one user of the plurality of users of completing one or more of the plurality of goals, wherein the second machine learning is trained using second historical data including an indication of whether one or more of the plurality of goals were completed.

3. The method of claim 1, further comprising applying, by the server, a second machine learning model to the data to identify one or more goals of the plurality of goals to be completed by at least one user of the plurality of users, wherein the second machine learning is trained using second historical data including completion of one or more of the plurality of goals.

4. The method of claim 1, further comprising storing, by the server on a database, data identifying the plurality of goals defined by the administrator device and available to be completed by the plurality of users.

5. The method of claim 1, further comprising providing, by the server to the plurality of computing devices associated with the corresponding plurality of users, access to data identifying the plurality of goals defined by the administrator device.

6. The method of claim 1, further comprising transmitting, by the server, a second alert message comprising a second indicator automatically generated in response to determining that the remaining amount in the first account satisfies at least one threshold of a plurality of thresholds defined by the administrator device.

7. The method of claim 1, further comprising automatically stopping, by the server, responsive to determining that the remaining amount is less than the threshold, transfer of amounts from the first account associated with the administrator device to one or more of the plurality of second accounts associated with the plurality of users.

8. The method of claim 1, wherein receiving the data further comprises receiving, from the plurality of computing device when in communication with the server, the data indicating completion of the at least one goal selected by a subset of the plurality of users over a plurality of locales.

9. The method of claim 1, wherein automatically generating the alert message further comprises generating the alert message comprising the indicator that transfer of amounts from the first account associated with the administrator device has been stopped responsive to determining that the remaining amount is less than the threshold.

10. The method of claim 1, wherein transmitting the alert message further comprises transmitting the alert message to present as a user interface element on the graphical user interface via which to provide the administrator device the immediate access to the information regarding the first account.

11. A system, comprising:
    a server having one or more processors coupled with memory, the server configured to:
      receive, from a plurality of computing devices, data indicating completion of at least one goal of a plurality of goals by a plurality of users across a plurality of networks, each of the plurality of goals defining a corresponding action to be completed;
      reconcile a plurality of transaction by verifying transfers from a first account to a plurality of second accounts associated with the plurality of users based on the data indicating the completion of the at least one goal;

apply a machine learning model to the data, wherein the machine learning model is trained using historical data indicating a rate of completion of one or more of the plurality of goals and previous transfers from the account;

determine, based on applying the machine learning to the data, a threshold against which to compare a remaining amount in a first account associated with an administrator device;

determine, responsive to reconciling, that the remaining amount in the first account is less than the threshold determined using the machine learning model;

automatically generate an alert message comprising an indicator that the remaining amount in the first account is less than the threshold; and transmit the alert message to present via a graphical user interface of the account to provide the administrator device immediate access to information regarding the first account.

12. The system of claim 11, wherein the server is further configured to apply a second machine learning model to the data determine a predicted likelihood of at least one user of the plurality of users of completing one or more of the plurality of goals, wherein the second machine learning is trained using second historical data including an indication of whether one or more of the plurality of goals were completed.

13. The system of claim 11, wherein the server is further configured to apply a second machine learning model to the data to identify one or more goals of the plurality of goals to be completed by at least one user of the plurality of users, wherein the second machine learning is trained using second historical data including completion of one or more of the plurality of goals.

14. The system of claim 11, wherein the server is further configured to store, on a database, data identifying the plurality of goals defined by the administrator device and available to be completed by the plurality of users.

15. The system of claim 11, wherein the server is further configured to provide, to the plurality of computing devices associated with the corresponding plurality of users, access to data identifying the plurality of goals defined by the administrator device.

16. The system of claim 11, wherein the server is further configured to transmit a second alert message comprising a second indicator automatically generated in response to determining that the remaining amount in the first account satisfies at least one threshold of a plurality of thresholds defined by the administrator device.

17. The system of claim 11, wherein the server is further configured to stop, responsive to determining that the remaining amount is less than the threshold, transfer of amounts from the first account associated with the administrator device to one or more of the plurality of second accounts associated with the plurality of users.

18. The system of claim 11, wherein the server is further configured to receive, from the plurality of computing device when in communication with the server, the data indicating completion of the at least one goal selected by a subset of the plurality of users over a plurality of locales.

19. The system of claim 11, wherein the server is further configured to automatically generate the alert message comprising the indicator that transfer of amounts from the first account associated with the administrator device has been stopped responsive to determining that the remaining amount is less than the threshold.

20. The system of claim 11, wherein the server is further configured to transmit the alert message to present as a user interface element on the graphical user interface via which to provide the administrator device the immediate access to the information regarding the first account.

* * * * *